United States Patent
Nicolai

(12) United States Patent (10) Patent No.: US 7,461,232 B2
Nicolai (45) Date of Patent: Dec. 2, 2008

(54) TRANSLATION LOOK-ASIDE BUFFER SUPPORTING MUTUALLY UNTRUSTED OPERATING SYSTEMS

(75) Inventor: Jean Nicolai, Chateauneuf-le-Rouge (FR)

(73) Assignee: STMicroelectronics SA, Montrouge (FR)

( * ) Notice: Subject to any disclaimer, the term of this patent is extended or adjusted under 35 U.S.C. 154(b) by 238 days.

(21) Appl. No.: 11/440,706

(22) Filed: May 24, 2006

(65) Prior Publication Data

US 2006/0271760 A1 Nov. 30, 2006

(30) Foreign Application Priority Data

May 31, 2005 (FR) ................................. 05 05487

(51) Int. Cl.
*G06F 12/10* (2006.01)
(52) U.S. Cl. ....................... 711/207; 711/163
(58) Field of Classification Search ......... 711/200–209, 711/163
See application file for complete search history.

(56) References Cited

U.S. PATENT DOCUMENTS

| | | | |
|---|---|---|---|
| 5,426,750 A * | 6/1995 | Becker et al. ............... | 711/207 |
| 5,437,016 A | 7/1995 | Ikegaya et al. ............... | 395/400 |
| 5,784,707 A * | 7/1998 | Khalidi et al. ............... | 711/206 |
| 2004/0143720 A1 | 7/2004 | Mansell et al. ............... | 711/206 |
| 2005/0081020 A1 | 4/2005 | Volp ........................... | 712/228 |

FOREIGN PATENT DOCUMENTS

| EP | 0 701 212 A2 | 3/1996 |
|---|---|---|
| EP | 0 797 149 A2 | 9/1997 |

* cited by examiner

*Primary Examiner*—Jack A Lane
(74) *Attorney, Agent, or Firm*—Lisa K. Jorgenson; E. Russell Tarleton; Seed IP Law Group PLLC

(57) ABSTRACT

A translation look-aside buffer that stores address translations each of which associate a VPN with a PPN, and which are usable in a first mode of operation of a processor incorporating the buffer for accessing data stored in physical memory. Each entry in the buffer includes a first field for storing the VPN, a second field for storing an intermediate address portion IPN, and a third field for storing the PPN. The first field and the third field are mutually associated via the second field. The buffer is addressable in the first mode of operation of the processor by the content of the first fields. In response to a request for access to eternal memory, it outputs the PPN stored in the third field of a given entry when it is addressed by an input value corresponding to the VPN stored in the first field of said entry.

20 Claims, 5 Drawing Sheets

TRANSLATION LOOK-ASIDE BUFFER SUPPORTING MUTUALLY UNTRUSTED OPERATING SYSTEMS

BACKGROUND OF THE INVENTION

1. Field of the Invention

The present invention relates generally to techniques for managing external memory utilized in processors (or CPU, for Central Processing Unit) and, more specifically, it concerns a buffer of memory pages, also called a Translation Look-aside Buffer (TLB).

2. Description of the Related Art

Transition Look-aside buffers (TLB) exist in processors using the concept of paged virtual memory. This is a hardware element that functions as a cache for the latest address translations used by the processor to access data stored in external memory when the processor is executing one or more application programs.

For this purpose, a TLB includes a given number N of lines or entries (Entry) for storing N respective address translations, each associating a given Virtual Page Number (or VPN) with a given Physical Page Number (or PPN). The virtual addresses are the only ones known to the application programs and consist of the VPN and an offset within the virtual page. The physical addresses, which are the real addresses of the locations where the words of data are stored in external memory, consist of the PPN and an offset within the physical page for locating the addressed word of data. The TLB is updated in a privileged mode of operation, for example by an operating system (OS) program or by an application program in secure mode.

To protect the data stored in external memory, a two-level address translation technique has been described in document EP 1 522 923. This technique is illustrated in the diagram in FIG. 1 herein. A Memory Management Unit (MMU) consists of two cascading TLBs 31, 32, each one performing an address translation. The level one TLB, or upper TLB 31, receives a virtual address VA as input, and issues an intermediate address IA as output, which corresponds to the translation of the VA address stored in the upper TLB 31.

Functionally, the upper TLB 31 is used like a conventional TLB in traditional architectures. In other words, from the point of view of the application program, everything occurs as if there was only one TLB, and as if the intermediate address IA pointed directly to a page in physical memory. This is not the case. The MMU comprises a level two TLB, or lower TLB 32, which performs a second address translation. More specifically, the lower TBL 32 receives the intermediate address IA as input and issues a physical address PA as output, which actually points to a memory page in physical memory.

The upper TLB may be configured in a privileged mode of operation, for example by a program of the OS (supervisor mode). One may configure the lower TLB in an even more privileged mode of the processor only, for example in a privileged mode of the OS (secure supervisor mode). Thus, programs running on the processor outside of this more privileged mode do not have access to the physical addresses, which guarantees the inviolability and integrity of the data stored in external memory.

Other examples of two-level address translation are disclosed in document U.S. 2004/0143720. In it a processor with two distinct modes of operation is described: a secure mode (S) and a non-secure mode (NS). The first level of address translation (virtual to intermediate) is commanded by the S or NS modes, while the second level of address translation (intermediate to physical) is commanded by the NS mode only.

A first embodiment is described, in which the processor only has one MMU and executes code (software) for merging page tables referencing two TLBs, one for each level of translation. In another described embodiment, the processor has a first and second cascading MMU, each with a TLB, for the first and second level of translation.

The two-level address translation technique offers great advantages. Yet it poses problems in performance and power consumption.

An ordinary CPU possesses a single level of address translation, meaning only one TLB. The operation of this hardware element is relatively slow and consumes power. The addition of a second cascading TLB has the effect of doubling the time necessary for translating a virtual address into a physical address, and also doubles the power consumption. These two consequences are difficult to accept in actual practice. Address translation is on the critical path when a user program is executed by a CPU. In addition, the TBL is one the parts of the CPU that consumes the most power (20% of the total power consumed by the CPU in certain cases).

BRIEF SUMMARY OF THE INVENTION

The disclosed embodiments of the present invention provide an improved implementation of the principle of double address translation. For this purpose, one embodiment of the invention proposes combining the two TLBs in FIG. 1 (upper and lower) into a single TLB with three columns.

In one aspect, the invention provides a translation look-aside buffer (TLB) comprising a given number N of entries for storing N respective address translations each associating a portion of a given virtual address with a portion of a given physical address and which, in an initial mode of operation of a processor incorporating said buffer, are usable for accessing data stored in physical memory. Each entry in the buffer includes a first field for storing the virtual address portion, a second field for storing an intermediate address portion, and a third field for storing the physical address portion, the first and third fields being mutually associated via the second field. In the first mode of operation of the processor, the buffer is addressable by the content of the first fields. The buffer is also designed to output, in response to a request for access to external memory, the physical address portion stored in the third field of a given entry when it is addressed by an input value corresponding to the virtual address portion stored in the first field of said entry.

In another embodiment, the first field and the second field of each entry are at least write accessible in a second mode of operation of the processor, in which the third field is not accessible.

In a further embodiment, for each entry:
the second field is read accessible in a third mode of operation of the processor; and
the third field is at least write accessible in said third mode of operation of the processor.

For example, each entry corresponds to a line of memory, and each field of said entry corresponds to a block of memory cells in said line of memory.

From the point of view of consumption, there is no penalty compared to a traditional address translation system (with one level of translation). In fact, the consumption is due essentially to comparisons made between the VPN given as input to the TLB, and the tags for the entries in the TLB. As this number of comparisons does not increase in the case of the present embodiments of the invention, neither does the consumption, while a system with two cascading TLBs therefore has twice the consumption.

From the point of view of speed, one must distinguish what occurs when the requested translation is found in the TLB (termed a TLB hit) from what occurs when the requested translation is not stored in the TLB (termed a TLB miss) and must therefore be loaded into the TLB from the page table. In the first case, the performance is approximately the same as in a traditional address translation system. In the second case, the duration is increased by the time necessary to updated the intermediate address field. As a TLB miss is generally millions of times less frequent than a TLB hit, the speed penalty in comparison to a traditional TLB is negligible. One will note that in a system with two cascading TLBs, the duration is doubled in both cases (TLB hit and TLB miss).

The disclosed embodiments of the present invention are particularly applicable to the concept of "virtualization", invented by IBM to enable multiple OS to run simultaneously on the same processor. An OS supported by the processor is called a guest OS in this context. In an example of this type of application, the first mode of operation (the least privileged) is a user mode, the second mode of operation is a supervisor mode corresponding to a guest OS, and the third mode of operation is a hypervisor mode (or VMM for Virtual Machine Monitor), which is designed to manage multiple guest OS. Each guest OS has access to its own page table but not to the page tables of other guest OS. The VMM has access to its own page table, which writes the translations for the various guest OS.

The embodiments of the invention may also be applied in the context of computer security, for secure encapsulation of operating systems. In this context, a processor may execute programs (software) in several modes. Typically, there is a non-secure user mode (for executing application programs), a non-secure supervisor mode (for executing OS programs), and a secure user mode as well as a secure supervisor mode. The first and second modes of the invention may then be the non-secure user mode and non-secure supervisor modes, which are reserved respectively for non-secure applications and non-secure OS (for example Windows® or Linux®). The third mode of operation of the invention is, for example, the secure supervisor mode, which is reserved for the secure OS. The secure user mode is optional, but has no influence on the proposed system.

In one embodiment, each entry in the TLB is tagged with an address space identifier (ASID). This enables implementation in systems with multiple OS using possibly distinct address spaces.

In applications in which the processor has an architecture of multiple contexts, each entry may be tagged with a context identifier (CID).

N is preferably between 4 and 8. This is a good compromise between the speed of searches in the TLB and a low level of power consumption on the one hand, and a frequency that is not too high of TLB misses which slow the system on the other hand.

The processor may be equipped with a direct memory access controller (DMA controller). In this case, in response to a request for direct access to external memory:
the buffer is addressable by the content of the second fields;
the buffer is designed to output the physical address portion stored in the third field of a given entry, when it is given an input value corresponding to the value stored in the second field of said entry.

The buffer may include a set of N comparators, each of them multiplexed to compare the input value with the content of the first field of the respective entries in the buffer in response to a request for access to physical memory, or to compare the input value with the content of the second field of the respective entries in the buffer in response to a request for direct access to physical memory. Thus, there is a single set of comparators for standard memory accesses (initiated by the CPU core) and for DMA accesses.

A second aspect of the invention relates to a processor comprising a translation look-aside buffer according to the first aspect of the invention.

A third aspect of the invention concerns a system comprising a physical memory and a processor according to the second aspect.

Lastly, a fourth aspect of the invention is relative to a process for using a translation look-aside buffer comprising a given number N of entries for storing N respective address translations, each of which associate a given virtual address portion with a given physical address portion, and which are usable in a first mode of operation of a processor incorporating said buffer, for accessing data stored in physical memory, each entry in the buffer comprising a first field for storing the virtual address portion, a second field for storing an intermediate address portion, and a third field for storing the physical address portion, with the first and third fields being mutually associated by the second field. The process includes the steps of:
in response to a request for access to external memory in the first mode of operation of the processor, the buffer is addressed with the content of the first fields;
the buffer outputs the portion of the physical address stored in the third field of a given entry, when the buffer is given an input value corresponding to the value of the virtual address portion stored in the first field of said entry.

In one embodiment, when the address translation corresponding to the access request is not available in the buffer, the first field and the second field of a selected entry in the buffer are updated in a second mode of operation of the processor in which the field with the physical address is not accessible.

In one embodiment:
the value stored in the second field of the buffer entry is read in a third mode of operation of the processor, after the updating of the first field and second field; and
the third field in the buffer entry is updated in said third mode of operation of the processor.

When the processor is equipped with a DMA controller, the process may also comprise steps consisting of:
in response to a request for direct access to external memory, the buffer is addressed with the content of the second fields;
the buffer outputs the physical address portion stored in the third field of a given entry, when the buffer is given an input value corresponding to the value stored in the second field of said entry.

In accordance with another embodiment of the invention, an electronic circuit is provided. The circuit includes a buffer having a plurality of address storage lines, each storage line having memory registers for storing address fields, including a first address field for storing a virtual page number, a second address field for storing an intermediate page number, and a third address field for storing a physical page number, the buffer configured to output the content of the memory register storing the physical page number in response to input of a virtual page number in a corresponding memory register that is associated with the memory register storing the physical page number and in response to an intermediate memory register storing an intermediate page number in the respective address storage line.

In accordance with another aspect of the foregoing embodiment, the memory register of the virtual page number and the memory register of the intermediate number are write accessible when the memory register storing the physical page number is not accessible. Ideally, the buffer is configured to output the content of the memory register storing the physical page number in response to a direct memory access to external memory request signal that is addressed to the memory register storing the intermediate page number on the corresponding address storage line when the input value of the request signal corresponds to the value of the intermediate page number.

In accordance with another embodiment of the invention, a method for operating a processor having a translation lookaside buffer is provided, the buffer having a plurality of address storage lines, each address storage line including memory registers for storing address fields that include a first address field for storing a virtual page number, a second address field for storing an intermediate page number, and a third address field for storing a physical page number, the method comprising: receiving a virtual address input value in the first address field, and outputting from the third address field a physical page number when the input value corresponds to the virtual address stored in the first address field.

BRIEF DESCRIPTION OF THE SEVERAL VIEWS OF THE DRAWINGS

Other characteristics and advantages of the invention will be made clear as the following description is read. This description is purely illustrative and refers to the attached drawings, in which.

DETAILED DESCRIPTION OF THE INVENTION

In the text below and in the figures, identical or similar elements bear the same references. First will be presented the case of a prior art address translation system, which has one level of translation.

Figure 2:
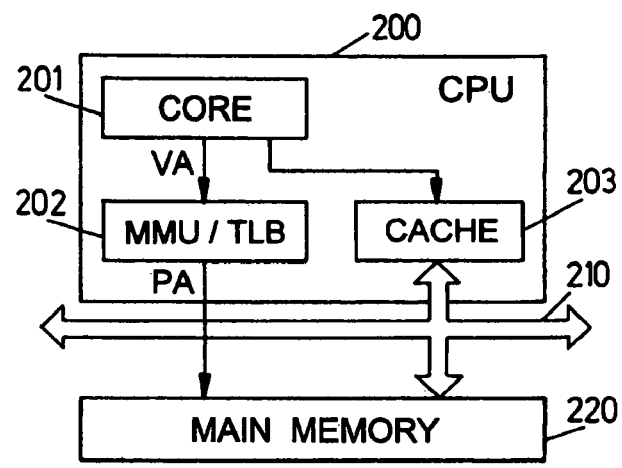
FIG. 2 is a block diagram illustrating an example of system architecture according to the prior art.

As shown in FIG. 2, one example is a processor (CPU) 200 with two distinct modes of operation: a user mode and a privileged mode, the privileged mode being reserved for the OS. The CPU 200 comprises a core 201 and a MMU 202. It also comprises a cache memory 203 through which it can access external physical memory 220, or the main memory of the system, via at least one bus 210.

Figure 3:
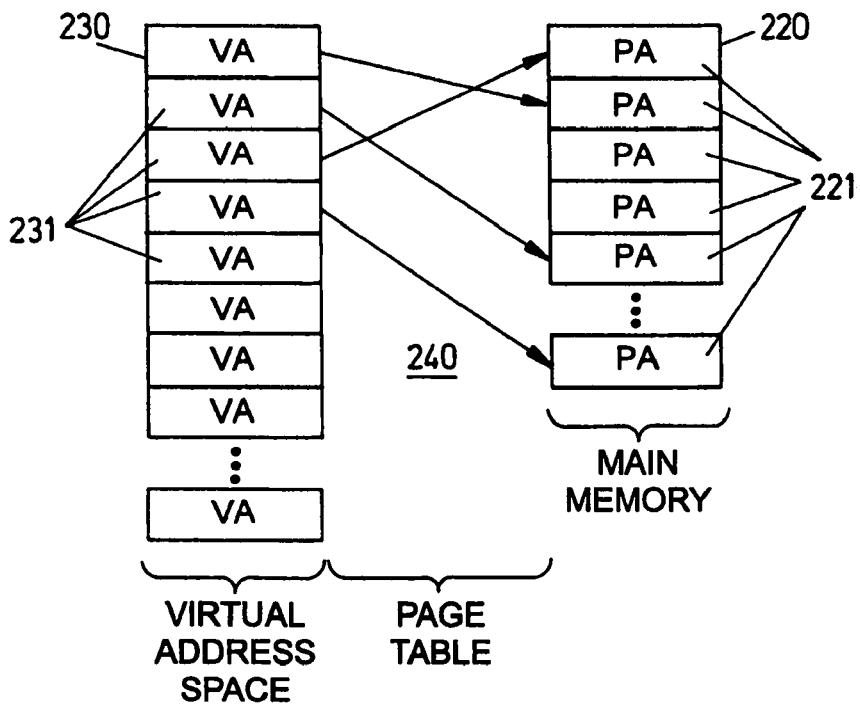
FIG. 3 is a diagram illustrating an example of a relation between a virtual address space and a physical address space established by a table of tables.

As shown in FIG. 3, the main memory 220 is generally divided into pages 221, which are contiguous zones of the same dimensions. In one example, memory pages of 65536 bytes (64 KB) are used. In this same example the system has a 32-bit bus 210. Each word in memory is therefore addressable with a 16-bit page number and a 16-bit offset. The virtual address space 230 is therefore 4 GB, or 65536 memory pages of 65536 bytes each. In practice many other sizes are used, and most MMU allow simultaneous management of memory pages of different sizes.

The page table is a table created and managed dynamically by the OS in memory, which gives for each page 231 of the virtual address space manipulated by the processor by virtue of a virtual address VA, the physical address PA of the corresponding page in physical memory 221. This allows each application program to use 4 GB of virtual address space while the actual existing physical memory, in DRAM (Dynamic Random Access Memory) for example, is generally much smaller, for example 256 MB. Thus a compiled application is relocatable: it does not need to be modified each time it is loaded into memory. When the OS loads it into memory, from a hard drive for example, it first verifies how much physical memory remains available and at which physical addresses, then it modifies the lines in the page table to include the new application. It can even be inserted into available blocks of non-contiguous physical memory, with the address translation system taking care of presenting the application with a contiguous space of the right size.

For example, assume there is an application which uses addresses 0 to 229000. This covers 4 pages of 64 KB. When the OS attempts to load this application, it verifies in its page table that it has 4 free pages of physical memory, and if it does, it modifies 4 lines in the page table. In the 4 "VPN virtual page number" fields on the left it will put 0, 1, 2, 3 corresponding to the virtual pages containing virtual addresses 0 to 262143. In the 4 "PPN physical page number" fields on the right, it will put the numbers of 4 available physical pages. It is irrelevant whether or not these pages are contiguous.

In FIG. 3, an example of a page table 240 is represented by the arrows connecting the boxes in the virtual address space 230 to the boxes in the main memory 220.

The OS can dynamically modify the page table, meaning the association between the VPN and the PPN. If it wants to load a new application and has insufficient physical memory, it can delete another application which is no longer active, or delete part of its code which is no longer in use, or transfer the data of another application into secondary memory by swapping it to the hard drive for example, or to larger but slower secondary storage.

The page table is therefore a list containing all possible virtual page numbers VPN in the leftmost fields (0 to 65536 in our example), and in the corresponding fields on the right, the physical page number PPN which corresponds to each of these virtual pages, if it exists. Each line in the page table is also tagged with one or more access control bits, indicating the access rights and other characteristics of the physical page concerned. These include a presence bit which indicates whether the physical page exists or not: as the virtual address space is 4 GB, many virtual pages have no corresponding physical page, and the corresponding line therefore has a presence bit set to 1 which indicates that the page should not be accessed.

In cases where the page table is walked by hardware (HPTW, Hardware Page Table Walk), the MMU 202 comprises two hardware components: the TLB and the page table walk system (PTW). In cases where the page table is walked by software (SPTW, Software Page Table Walk), the MMU is reduced to the TLB. Some recent processors use the HPTW, others the SPTW: both types exist in actual practice. In the text below, the terms TLB or MMU will be used interchangeably when the mechanisms for walking the page table are not the focus.

These and other concepts will now be presented more extensively before providing a description of the invention itself.

The principle of address translation without a TLB will first be described, with references to FIG. 4.

When an application program is executed, with each new instruction the CPU presents one or more new virtual addresses VA to the address translation system. The low order bits (16 bits in the example) of the VA address define an offset which indicates a shift within the memory page addressed. These are sent directly to main memory, or in a variant, to the cache memory or the peripheral addressed, as the low order bits of the physical address PA issued as output from the TLB.

The high order bits (16 in the example) of the VA address define the virtual page number or VPN. They are sent to the translation system, which looks in the page table for the corresponding physical page number PPN, then sends it to main memory, cache memory, or the addressed peripheral. The translation system, which is reduced here to the page table 204, contains as many lines (65536) as there are possible virtual pages. This is true even though, as the physical memory is much smaller, only some of the lines point to a page which physically exists, with the presence bit of the others set to indicate "no physical page, access prohibited".

Searching the page table 240 is therefore trivial: the virtual page number VPN indicates the line number of the memory to be read, and it is sufficient to multiply by the line dimension (for example 8 bytes) and add the address (PTBA for Page Table Base Address) of the first line in the page table 240 in main memory 220, in order to obtain the physical page number PPN of the memory page desired.

The page table is itself placed in main memory 220 because of its large size (65536 lines). If it were smaller, it could be placed in smaller dedicated SRAM, close to the processor core.

The processing of a virtual address VA, which occurs with each new instruction from the processor, therefore requires accessing external memory twice: once to read the physical page number PPN corresponding to the virtual page number VPN of the virtual address, and the second to fetch the requested instruction from the reconstituted physical address (physical page number PPN+offset in the page). As accessing external memory is very slow (typically 10 times longer than accessing cache memory), this system is unacceptable and gave rise to the appearance of MMU.

The TLB is the part of the MMU which is a cache of the page table. It is very fast memory which contains the N lines most recently used in the page table. Current TLB typically contain a very small number N of lines, with N ranging from 4 to 64 for example, so as to be very fast and consume little power. A TLB of N lines, for example, contains the N lines most recently used out of the 65536 contained in the page table. Each of the N lines describes a page of 65536 bytes existing in physical memory.

Figure 5:
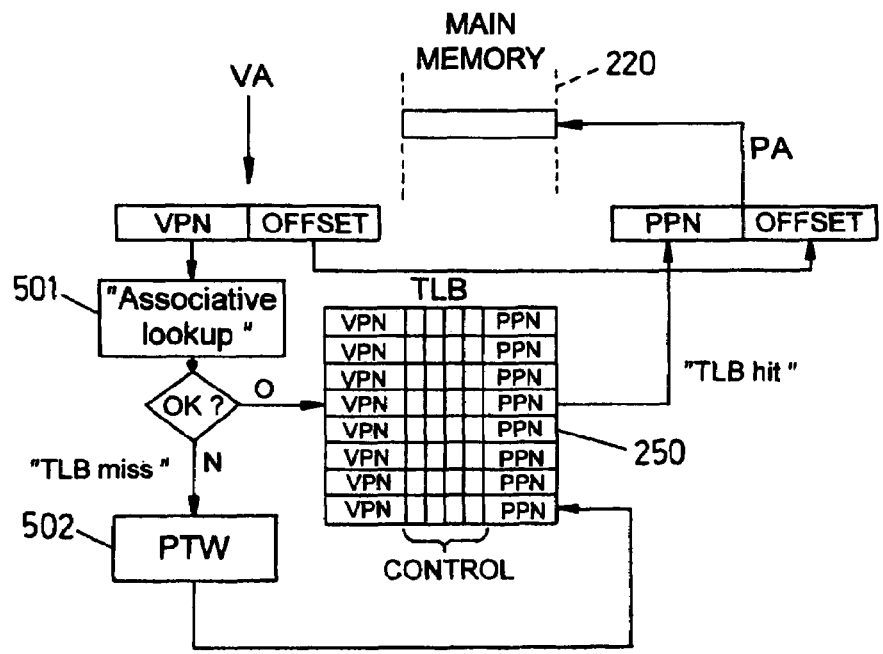
FIG. 5 is a functional diagram illustrating the principle of address translation performed in a processor with a TLB according to the prior art.

The principle of address translation with a TLB 250 will now be described with references to FIG. 5, using an example where N=8.

Each line in the TLB 250 is tagged with access control bits and contains the physical page number PPN, like the page table. But unlike the page table, it also contains the virtual page number VPN for each of 8 referenced translations. Whereas the right line in the page table is found simply by the position of the line, since the page table contains all 65536 lines, only 8 lines are present in the case of the TLB. To find the right line among the 8 ones present, the VPN number of the virtual page requested by the CPU is compared simultaneously to all the virtual page numbers in the 8 lines contained in the TLB.

The TLB comprises two types of data. One type is the data to be compared during a search. This concerns 8 virtual page numbers PPN, plus occasionally other data such as miscellaneous identification bits. These data provide tags for each entry in the TLB. This is why the memory registers containing them are sometimes called tag RAM. The other type is the data which will be used when the search allows indicating which is the correct line of the 8, meaning the physical page numbers plus the associated access control bits, particularly a bit indicating whether the line is currently valid. The memory registers containing these data are sometimes called data RAM.

The comparison step 501 between the VPN of the virtual page requested by the CPU and the virtual page numbers of the 8 lines contained in the TLB, is done simultaneously to save time. The term used, Associative Lookup, reveals the simultaneous character of these comparisons.

Figure 4:
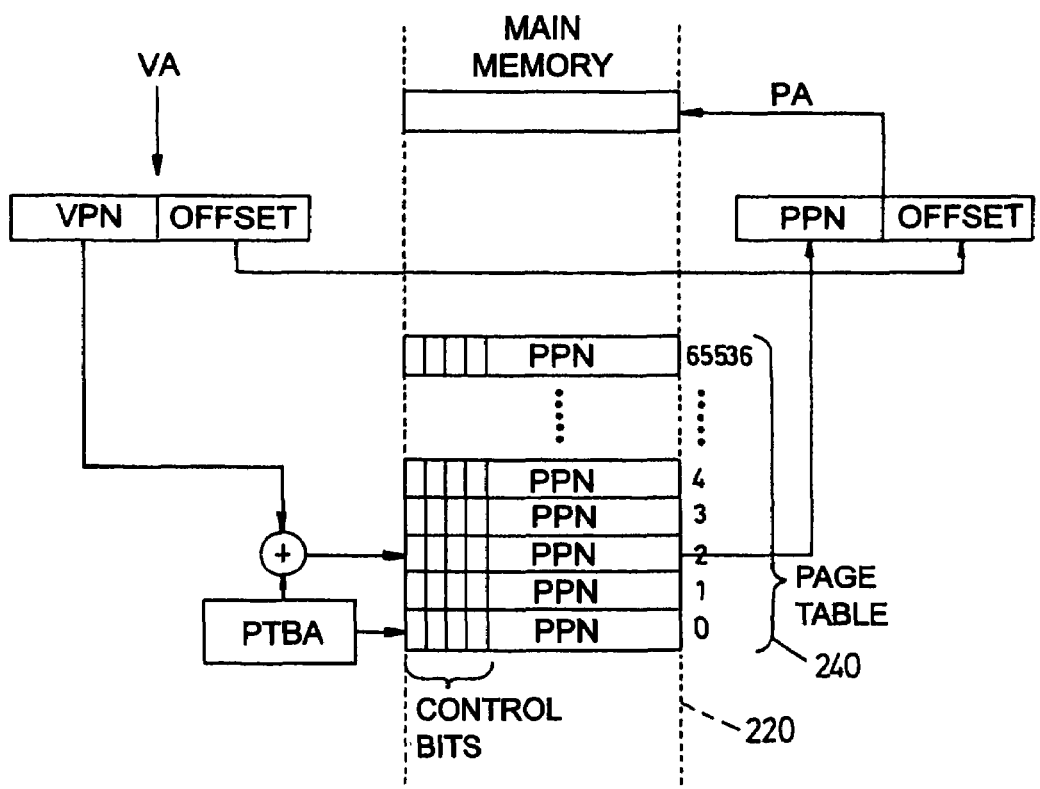
FIG. 4 is a functional diagram illustrating the principle of address translation performed in a processor without a TLB using the complete page table.

If the result of the search is positive (a TLB hit), the physical page number PPN stored in the TLB line concerned is sent to external memory as the high order bits of the reconstructed physical address PA (combined with the PPN offset), as is illustrated in the case in FIG. 4.

If, however, the result of the search is negative (a TLB miss), then the TLB is updated with the requested translation by performing a page table walk (PTW) in step 502. For this purpose, a PTW hardware unit is activated (HPTW) or the PTW algorithm is applied (SPTW). The line in the TLB which is overwritten with the new translation may be selected by a LRU (Least Recently Used) algorithm.

Figure 6:
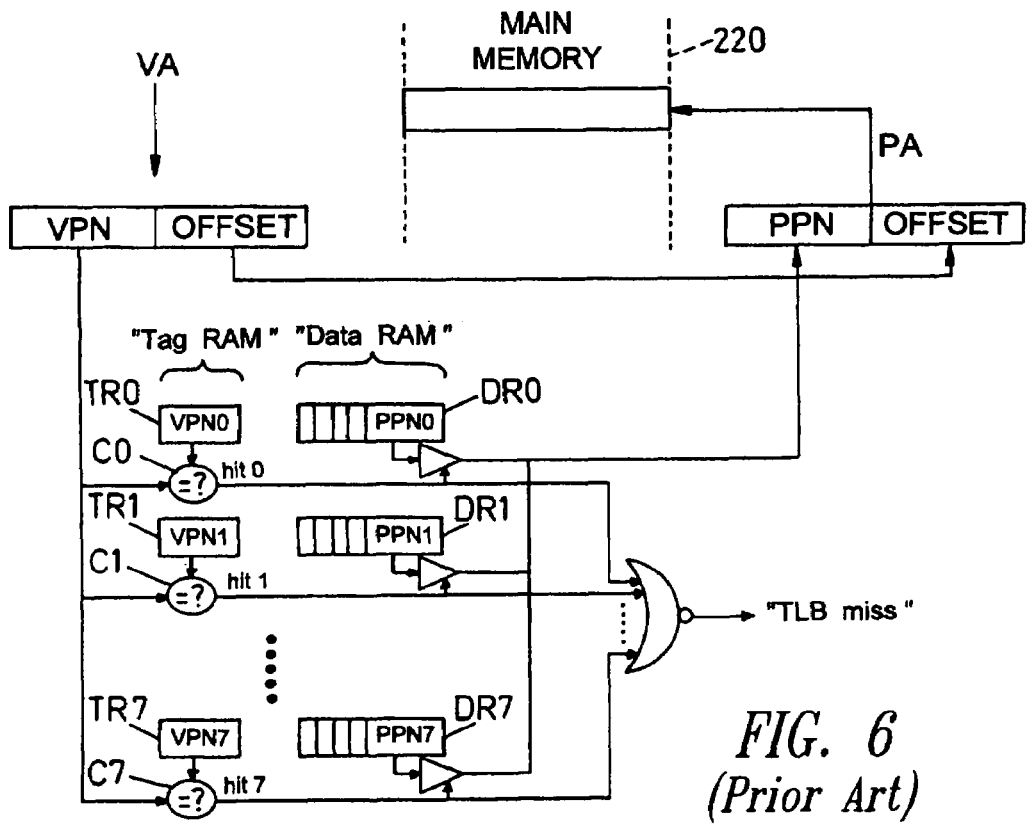
FIG. 6 is a functional diagram illustrating an embodiment of a TLB according to the prior art.

The block diagram in FIG. 6 illustrates a possible embodiment of the means for searching the TLB.

Such means comprise 8 comparators, C0 to C7 respectively, each receiving the VPN value as a first input, and the content of a memory register, TR0 to TR7 respectively, as a second input. Registers TR0 to TR7 form the tag RAM mentioned above. They correspond to a first field containing a virtual address portion, VPN0 to VPN7 respectively, of the corresponding address translation. Thus, each time the CPU presents a new virtual address VA as input to the TLB, the 16 high order bits of this address (corresponding to the VPN to be searched for in the TLB) are simultaneously compared to the respective tags for the 8 address translations stored in the TLB (corresponding to the VPN belonging to these translations), using the 8 comparators C0 to C7. It is these 8 comparators which cause the majority of the power consumption and explain why the TLB have relatively few lines, because the consumption is proportional to the number of comparisons. In addition, although the comparisons are simultaneous, the higher the number of comparators the longer the comparison time, because of the higher charging/discharging capacitance during the comparison. If one of the registers TR0 to TR7 contains the desired virtual page number VPN, a corresponding line hit0 to hit7 is set to 1.

Lines hit0 to hit7, when they are set to 1, validate the data stored in another register, DR0 to DR7 respectively. This validation authorizes issuing the physical page number PPN as output from the TLB, in the additional case where the access is authorized.

Registers DR0 to DR7 form the data RAM. They contain the physical page numbers, PPN0 to PPN7 respectively, of the address translations stored in the TLB, as well as the associated access controls bits.

The data stored in registers TR0-TR7 and DR0-DR7, respectively the tag RAM and data RAM, were previously written by the OS (in the SPTW case) or by a hardware mechanism (in the HPTW case). Note that in the HPTW case, these data can only be written to their respective registers when the processor is in privileged mode, meaning that only the OS has the right to manipulate the address translations in the TLB.

If no comparator gives a positive response, this is a TLB miss. The corresponding information is, for example, issued as output from an 8-input NOR logic gate, where the inputs are paired with lines hit0 to hit7 respectively. In the case of the HPTW, this triggers the hardware mechanism for walking the page table, and places the processor in a wait state during the process as there is no PPN to provide to it. In the case of the SPTW, the output from the NOR gate triggers an exception which switches the processor to privileged mode and branches to a predefined interrupt function which is part of the OS.

This function will walk the page table in external memory by presenting the desired VPN value as an index, in other words the memory address PTBA+VPN times the number of bytes in a line of memory. The page table is placed in a part of memory reserved for the OS, meaning for privileged mode. When it has extracted the corresponding PPN value from memory and the associated access control bits, it will write the address translation information to one of the 8 lines in the TLB: the VPN field to one of the TR0-TR7 registers, and the PPN field as well as the associated access control bits to the corresponding DR0-DR7 register. As has already been said, the selection of which of the 8 lines in the TLB to overwrite can be based on a LRU algorithm where the least recently used line is overwritten. This algorithm is generally coded in the interrupt routine. Then control returns to user mode, and the VA address presented to the TLB now corresponds to an address translation contained in the TLB.

In a processor with HPTW, the work of the interrupt routine is performed by a dedicated hardware module while the processor waits. The hardware is activated for this purpose by the TLB miss signal, which also places the processor in a wait state.

We will now describe an embodiment of the TLB of the invention, in an example where it is applied in the virtualization of a processor. In this application, the processor can support multiple OS. There are 3 modes of operation: user mode (the least privileged), supervisor mode (one of the guest OS), and hypervisor mode (the most privileged). Each guest OS has access to its own page table but not to those of the other guest OS. The OS program which executes in hypervisor mode, called the Virtual Machine Monitor (VMM), manages the different guest OS. It has access to its own page table, which redirects the translations for the guest OS.

For the different guest OS to be virtualized, each one must believe that it is alone on the system and controls the hardware directly. This is the only way it is possible to use unmodified commercial OS (Legacy OS). It is the VMM which installs the guest OS and confines them, redirecting their requests for memory access so that they do not interfere with each other.

On a PC for example, the buffer for the graphics monitor is at a fixed address, for example A000, and subsequent addresses. If there are two guest OS, Windows® and Linux® for example, both will write to the physical address A000 in order to address the monitor. The role of the VMM is to multiplex the two OS. For example, it may reserve access to the monitor via the address A000 for itself, and redirect the Windows® or Linux® monitor accesses to secondary buffers. In this case, it will translate a Windows® access to address Axxx into something else, for example address Bxxx, and a Linux® access for example into address Cxxx. This allows both guest OS to write freely to what they believe is the physical address Axxx. Otherwise they would have to be modified in order to install them as guest OS on the same machine.

Figure 1:
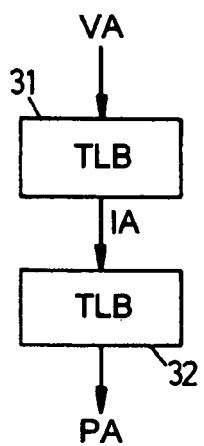
FIG. 1 is a diagram illustrating the principle of the two-level address conversion according to the prior art.
Figure 7:
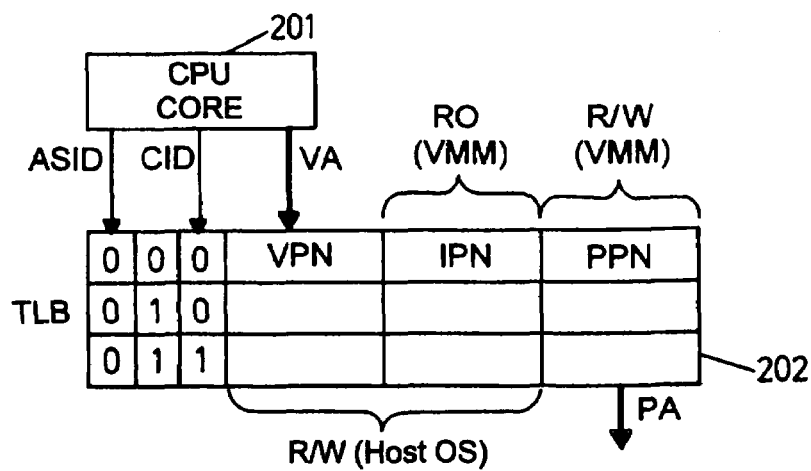
FIG. 7 is a diagram illustrating the operation and the read and/or write access rights for a TLB in embodiments of the invention.

As is shown in FIG. 7, which is to be compared to the diagram in FIG. 1 illustrating the prior art, the principle of the two-level TLB according to the embodiments of the invention is as follows.

The TLB includes a given number N of lines or entries for storing N respective address translations. One should recall that an address translation associates a given virtual address portion, here a virtual page number (VPN), with a corresponding physical address portion, here a physical page number (PPN). In a first mode of operation, these translations are usable by the processor for accessing the data stored in external memory. In the context of OS virtualization, this first mode of operation is, for example, the user mode, in which the application programs execute.

Each entry includes a virtual address field storing the VPN, an intermediate address field storing an intermediate page number (IPN), and a physical address field storing the PPN. The intermediate address field is associated with the virtual address field and with the physical address field. In practice, this association translates into the fact that the memory registers storing these fields are in the same line. It is for this reason that we speak of a three column TLB. In comparison to the two cascading TLB of the prior art, this organization in memory is more efficient because it avoids duplication of the intermediate address portion IPN. But the primary advantage resides in the impact on the translation of an address, in terms of speed and power consumption, as will be seen further on.

In the first mode of operation of the processor (user mode), the TLB is only addressable by the content of the virtual address fields. In other words, the memory in which the address translations of the TLB are stored is Content Addressable Memory (CAM). The TLB is searched with the virtual address VA provided as input, using associative lookup to compare the VPN stored in the $1^{st}$ column of the TLB against the corresponding portion of this PA address. In addition, the TLB is designed to output a physical address PA containing the physical address portion PPN stored in the physical address field of a given entry, when it is addressed by an input value corresponding to the value of the virtual address portion VPN stored in the virtual address field of this entry (TLB Hit). From a functional point of view, this is how the abovementioned mutual association between the virtual address, intermediate address, and physical address fields is represented.

Advantageously, with each access to the TLB in user mode, there is only one search for a correspondence between the virtual address VA provided as input to the TLB and the virtual address portions VPN stored in the $1^{st}$ column, while the address translation is effectively a two-level translation. It is this step of searching for a correspondence which consumes time and power. The invention therefore avoids doubling this time and power consumption, unlike the prior art TLB with its single level of translation.

In one embodiment, each entry in the TLB is also tagged with fields of identification data. For example, such a field may contain a context identifier (CID), of 1 bit in this example. Another field of this type may store an address space identifier (ASID), of 2 bits in this example. This may be designed so that in order for a translation to be done by the TLB, the corresponding request must have a valid CID and ASID as parameters, meaning they must correspond to the values stored in the identification data fields for the entry in the TLB storing said translation. The CID enables the reservation of translations stored in the TLB for a given process executing in the CPU. The ASID enables the reservation of translations stored in the TLB for application programs of a given OS, which may have a specific address space.

For each entry, the virtual address field and the intermediate address field ($1^{st}$ and $2^{nd}$ columns) are read/write accessible (R/W) in a second mode of operation of the processor. In the context of OS virtualization, this second mode of operation is, for example, the supervisor mode, in which the OS processes execute. The physical address field is not accessible (neither read nor write accessible) in this second mode of operation. Thus a guest OS, even in supervisor mode, cannot modify the confinement established at its installation.

Even so, special measures are provided to enable updating the TLB in case of a TLB miss.

The intermediate address field ($2^{nd}$ column) is read-only accessible (RO) in a third mode of operation of the processor. In the context of OS virtualization, this third mode of operation is, for example, hypervisor mode, in which the VMM executes. Preferably the intermediate address field is not write accessible by the VMM so that the latter is not permitted to modify data written by a guest OS.

The physical address field ($3^{rd}$ column) is at least write accessible, and preferably read and write accessible (R/W) in the third mode of operation of the processor, meaning by the VMM. Thus from the IPN address portion read from the intermediate address field ($2^{nd}$ column), the VMM can program the physical address field ($3^{rd}$ column). For this purpose, it performs a walkthrough of its own page table.

Figure 8:
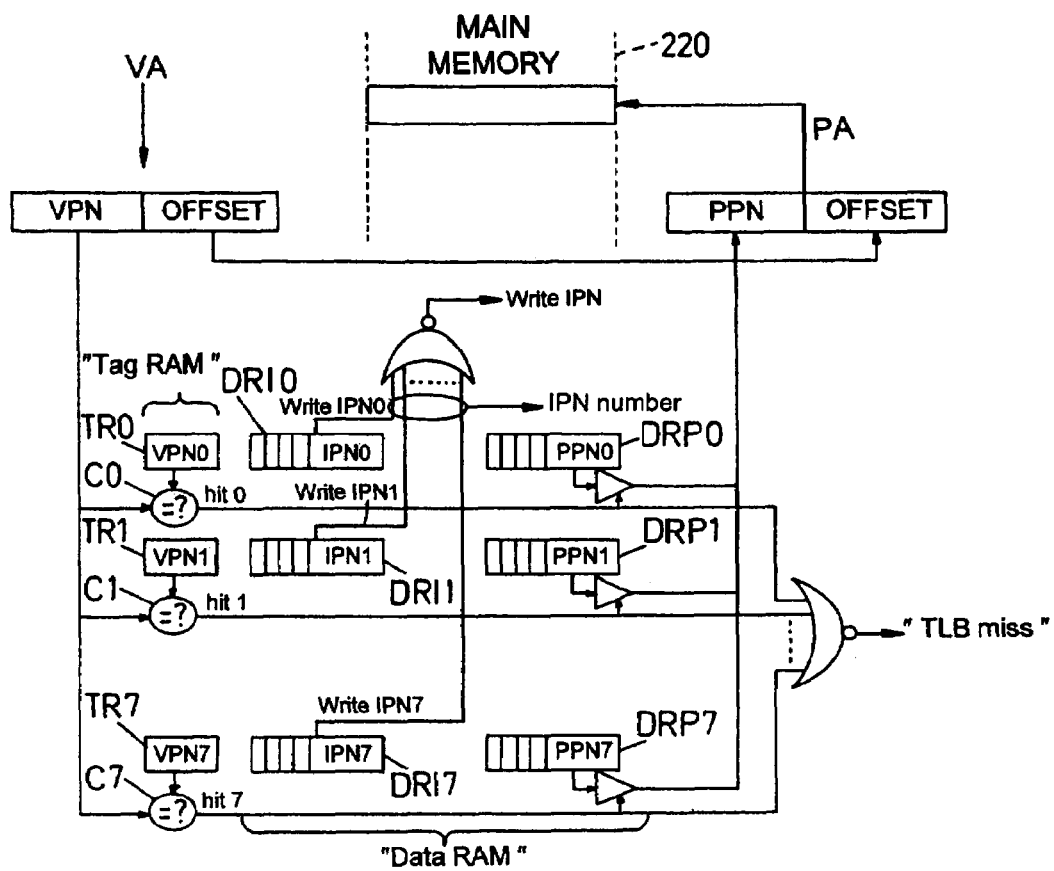
FIG. 8 is a functional diagram illustrating an embodiment of a TLB according to the invention.

One embodiment of the TLB according to the invention will now be described schematically, with reference to FIG. 8. In this embodiment, N is again equal to 8.

In comparison to the traditional implementation of the TLB presented above with reference to FIG. 6, the part corresponding to the Tag RAM with memory registers TR0-TR7 and comparators C0-C7 is unchanged. But the part corresponding to the data RAM now contains two memory registers per line in the TLB. The first of these registers, DRI0 to DRI7 respectively, contains the intermediate page number, IPN0 to IPN7 respectively. The second of these registers, DRP0 to DRP7 respectively, contains the physical page number, PPN0 to PPN7 respectively. A line's two registers may also contain identification bits such as the CID and/or ASID bits.

When one of lines hit0 to hit7 is set to 1, it activates outputting the respective number PPN0 to PPN7 from the TLB, in the same manner as in a traditional TLB (FIG. 6). In other words, in the case of a TLB hit, the data stored in register DRPx (i.e., PPNx number) are used as the physical page number PPN for addressing the external memory via the physical address PA.

In the traditional TLB, the data in the Tag RAM and the Data RAM are read/write accessible in supervisor mode, and read/write inaccessible in user mode. This allows only the OS to manipulate them. In some embodiments of the invention, the data in the Tag RAM are also read/write accessible in supervisor mode. More particularly, the data in the DRIx registers (the IPNx numbers) are read/write accessible in supervisor mode and read-only in hypervisor mode, or even a possible mode of operation having a higher priority, such as the secure supervisor mode in secure architectures, for example. And the data in the DRPx registers (the PPNx numbers) are read/write accessible in hypervisor mode (or also in the possible higher priority mode of operation).

In addition, a write of any of the IPNx data triggers a hardware exception which sets the processor in hypervisor mode and branches to a predefined interrupt function which is part of the VMM. In one embodiment, as represented, a line Write_IPN0 to Write_IPN7 respectively is set to 1 when the respective register DRI0 to DRI7 is write accessed. A NOR logic gate, in which the inputs are paired with lines Write_IPN0 to Write_IPN7, outputs a Write_IPN signal. The hardware indicates which of the registers DRI0 to DRI7 was written to, for example by writing in a supplemental register (not represented) or by passing the corresponding number 0 to 7 as a parameter to the interrupt function.

Figure 9:
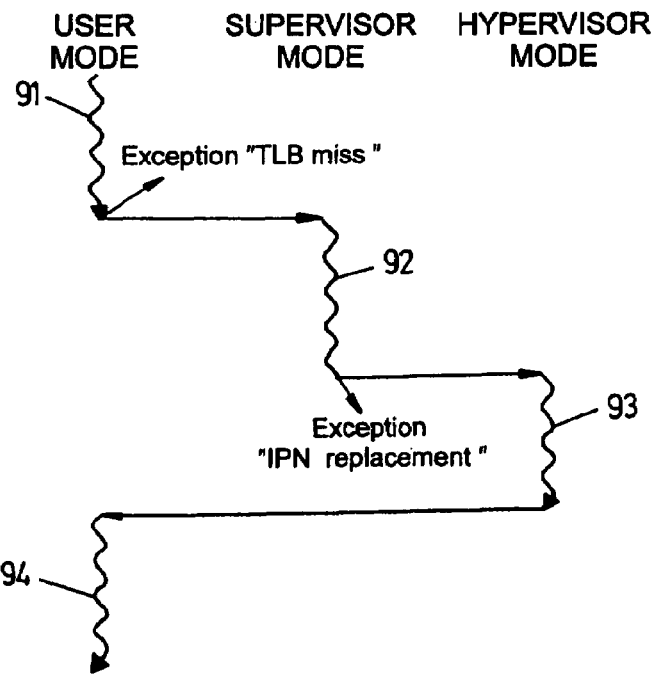
FIG. 9 is a diagram illustrating the different modes of operation of a processor according to the process of the invention.

The operation of the TLB in the three modes of operation of the processor will now be described with additional references to FIG. 9.

In user mode, an application program performs a step 91 which accesses external memory 220. Each time, a virtual address VA is presented as input to the TLB for translation. The portion of this virtual address corresponding to the VPN is used to address the Tag RAM of the TLB. If the TLB contains the address translation which includes this VPN (i.e., a TLB hit), the associated PPN is issued as the corresponding portion of the physical address PA which is output from the TLB. Otherwise, an interrupt or TLB miss exception is generated. This interrupt places the processor in supervisor mode.

In a step 92, the active guest OS (the one which supports the application program currently executing) searches its translation look-aside buffer for the missing address translation. It then selects the line in the TLB which must be overwritten, for example by applying the LRU algorithm mentioned above. It then manages the TLB by respectively writing to one of the TRx registers in the Tag RAM and to the associated DRIx register in the Data RAM, the VPN number and the IPN number of the translation to be added. It is unaware of the existence of the DRPx register intended to store the PPN number, or at least cannot access it, as this register is reserved for the hypervisor.

Updating a TRIx register activates the corresponding Write_IPNx line, which activates the Write_IPN signal for generating a second exception, called "IPN replacement". This interrupt sets the processor in hypervisor mode, and branches to a predefined function.

In a step 93, this function of the VMM (executing in hypervisor mode) receives as an input parameter the number x of the IPN which was just written, enabling it to read the IPNx number in the TRIx register just overwritten. The VMM receives for this purpose the IPN number (x index) concerned. On the basis of the IPNx number read in this way, said function then explores the page table reserved for the VMM, in order to retrieve the corresponding "IPNx=>PPNx" translation. Then it writes the retrieved PPNx number into the TRPx register in the Data RAM. When this write is complete, the processor returns to user mode.

In a step 94, the application program can then obtain from the TLB the desired VA=>PA translation, and access the main memory 220 of the system.

To summarize, if the guest OS, for example Windows®, has placed in line 1 of the TLB a translation for accessing the graphics memory, it will have written the address IPN1=A000 in register DRI1, and it will have written in register TR1 the portion of the virtual address VPN1 which its applications must virtually access in order to access the graphics memory. The hypervisor will have placed another value PPN1 in register DRP1, for example B000. Thus any access of a Windows® application to the display will be redirected to address B000, without any modification to Windows® and without generating any functional problem, and also without Windows® being alerted or entering error mode.

There are therefore as many page tables in memory as there as guest OS, plus one table which belongs to the hypervisor.

One will note that in the case of a TLB hit, which is the most common, the time to find a PPN once a VPN is presented is linked solely to the comparisons between the VPN and the data in the Tag RAM. The amount of data stored in the Data RAM has no influence. The operating speed is therefore nearly the same as that of a traditional TLB. This is a huge advantage over other proposals (patent application U.S. 2004/0143720 discussed in the introduction) where there are two cascading traditional TLB: one to translate the VPN into an IPN, followed by a second to translate said IPN into a PPN. In the latter case the time is doubled, which is unacceptable because a search of the TLB occurs with each basic instruction (opcode), meaning several times per instruction from a program application.

In the rarer case of a TLB miss, the processor passes from user mode to supervisor mode and jumps to the interrupt function of the guest OS dedicated to TLB misses, which takes a certain amount of time. Once the IPNX number has been written, the processor jumps to the hypervisor function which reads the IPNX number, walks the hypervisor table, and replaces the PPNX number with the result. In comparison to a traditional TLB where only the "TLB miss" interrupt is processed, the duration is increased by the time needed to process the "IPN Replacement" interrupt. A TLB miss is generally thousands of times less frequent than a TLB hit, so the speed penalty in comparison to a traditional TLB is negligible.

Figure 10:
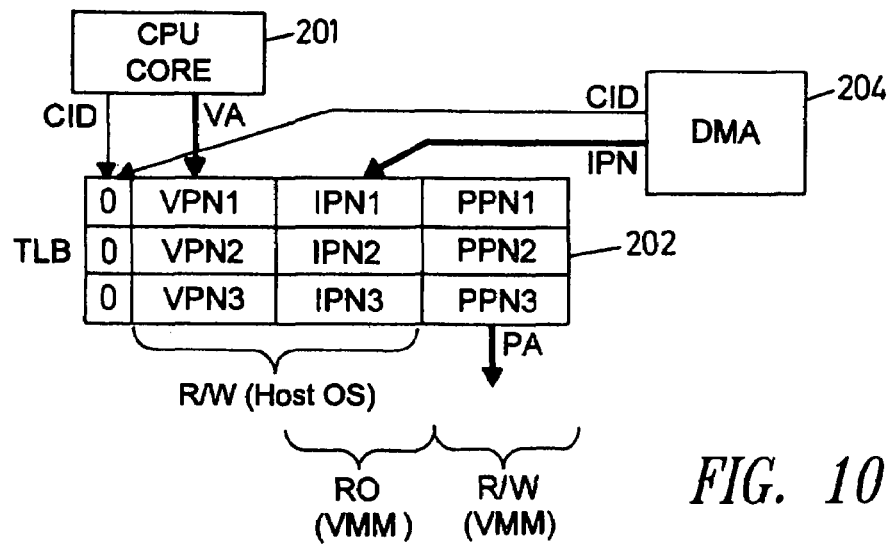
FIG. 10 is a diagram illustrating the operation of a TLB according to the invention in a processor equipped with a DMA controller.

As is shown in FIG. 10, the guest OS can schedule any DMA (Direct Memory Access) using what it believes are physical addresses, meaning intermediate addresses. One may design a DMA controller 204 generating intermediate addresses, thus providing a virtualized DMA which works perfectly well with the guest OS system and the proposed hypervisor.

To simplify, FIG. 10 shows an example where the entries in the TLB 202 are only tagged with a context identifier CID and not with an address space identifier ASID. A DMA request therefore passes as parameters an intermediate page number IPN and an associated context identifier CID. This IPN and CID are compared to the corresponding data stored in the lines of the TLB, as in the first mode of operation for the VPN and CID.

In one embodiment, for this purpose one can add to the TLB a set of additional comparators which compare the IPNx data stored in the TRx registers with the address value presented by the DMA controller. This amounts to treating the IPNx data as tags. The graphical representation of these comparators would be an extension of the diagram in FIG. 8, which does not seem necessary to provide here. Preferably, these additional comparators are only used during operation of the DMA, to avoid penalizing the TLB in terms of consumption. In addition, it may be set up so that when the DMA controller is in operation, the TLB can no longer translate the VPN address portions coming from the CPU. Due to this, the CPU may be placed in a wait state during the DMA transfer.

Figure 11:
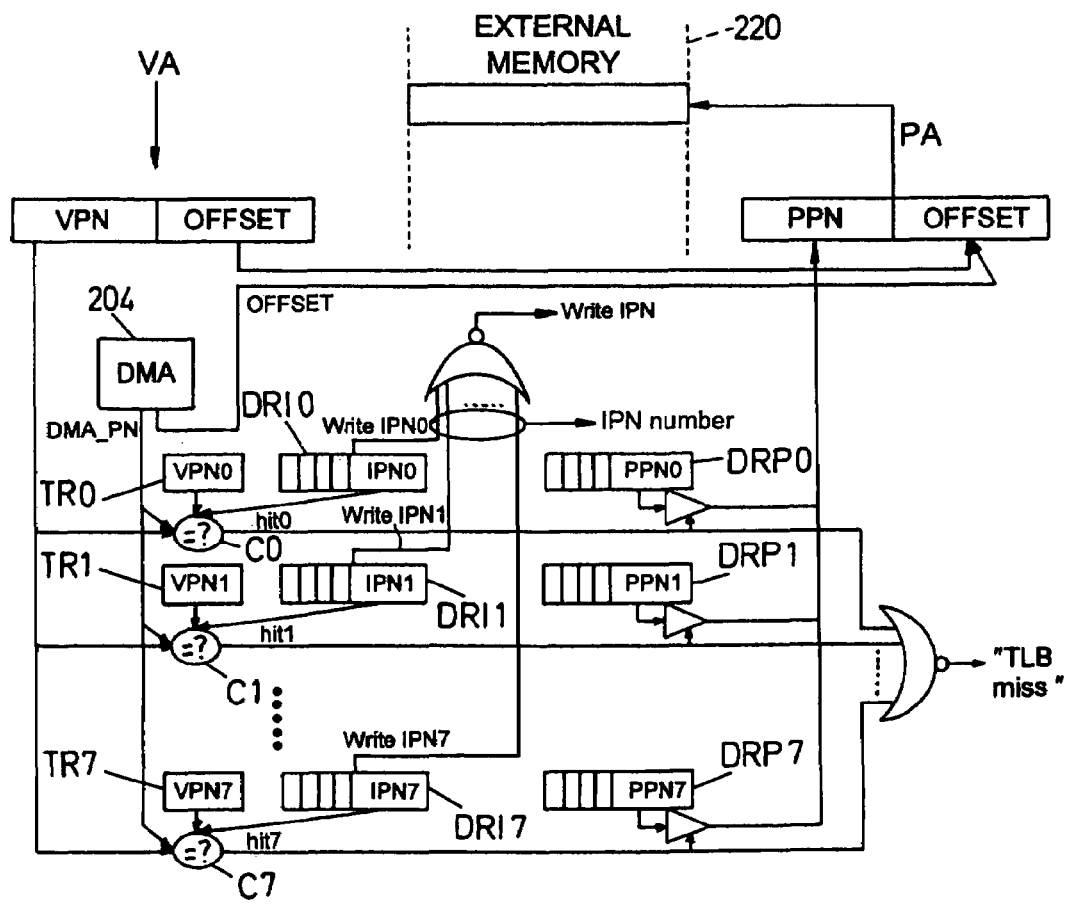
FIG. 11 is a functional diagram illustrating an embodiment of a TLB according to the invention in a processor equipped with a DMA controller.

In one embodiment illustrated in FIG. 11, the circuit may use the already existing comparators by multiplexing them, instead of additional comparators. In this embodiment, in response to a DMA request, the entries in the comparators usually receiving the virtual page number VPN presented by the CPU here receive the IPN page number presented by the DMA controller. In addition, the entries in the comparators usually receiving the virtual page numbers VPNx stored in the TRx registers here receive the intermediate address numbers IPNx stored in the DRIx registers.

In both embodiments, the consumption is not affected by the DMA functionality this offers, because only one set of comparators is used at a time. Those provided for processing a translation as part of a DMA request, if they are different from the ones provided for processing the translations of a normal CPU request, may in fact be deactivated when there is no DMA transfer in progress.

Additional measures may be taken in case of a TLB miss for a DMA request. Of course, normally a DMA transfer has been prepared for beforehand by the application or the guest OS, such that one might think there would not be a TLB miss because, in principle, the right translations are installed in the TLB beforehand. However, in systems where one cannot guarantee this, there could be cases in the TLB where there is no IPNx corresponding to the IPN page number presented by the DMA controller.

In this case, the exception triggered by the TLB miss may activate the hypervisor mode to replace a IPNx-PPNx pair. The hypervisor mode must therefore select one of the 8 lines to be overwritten in the TLB. Only the IPNx and PPNx portions of the address will be replaced, and not the corresponding VPNX number. In this case, it can be set up so that the hypervisor function sets the line validity bit to 0, to indicate to the CPU when it resumes that this line does not contain valid information. The DMA controller can be set up to function even with a translation that has a validity bit set to 0.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A translation look-aside buffer, comprising:
    a given number N of entries for storing N respective address translations which each associate a given virtual address portion with a given physical address portion, and which are usable in a first mode of operation of a processor incorporating said buffer for accessing data stored in a physical memory, each entry in the buffer comprising a first field for storing the virtual address portion, a second field for storing an intermediate address portion, and a third field for storing the physical address portion, the first and third fields being mutually associated via the second field;
    in a first mode of operation of the processor, the buffer is addressable by the content of the first fields, wherein the buffer is configured so that, in response to a request for access to external memory, it outputs the physical address portion stored in the third field of a given entry when it is addressed by an input value corresponding to the virtual address portion stored in the first field of said entry; and for each entry, the first field and the second field are at least write accessible in a second mode of operation of the processor in which the third field is not accessible; and, for each entry the second field is read accessible in a third mode of operation of the processor, and the third field is at least write accessible in the third mode of operation of the processor.

2. The buffer of claim 1 wherein each entry corresponds to a line of memory, and wherein each field of said entry corresponds to a block of memory cells in said line of memory.

3. The buffer of claim 1 wherein the first mode of operation is a user mode in which at least one application program is executed by the processor, the second mode of operation is a privileged mode in which at least one process of a guest operating system is executed by the processor, and the third mode of operation is a virtual machine monitoring mode.

4. The buffer of claim 1 wherein the first mode of operation is a user mode, the second mode of operation is a non-secure supervisor mode, and the third mode of operation is a secure supervisor mode.

5. The buffer of claim 1 wherein each entry is tagged with an address space identifier.

6. The buffer of claim 1 wherein each entry is tagged with a context identifier, as the processor has an architecture of multiple contexts.

7. The buffer of claim 1 wherein N is between 4 and 8.

8. The buffer of claim 1 wherein, in response to a request for direct access to external memory:
the buffer is addressable by the content of the second fields; and
the buffer is set up to output the physical address portion stored in the third field of a given entry when it is addressed by an input value corresponding to the value stored in the second field of said entry.

9. The buffer of claim 8, comprising a set of N comparators, each of which are multiplexed so as to compare the input value with the content of the first field of one of the respective buffer entries in response to a request for access to physical memory, or to compare the input value with the content of the second field of one of the respective buffer entries in response to a request for direct memory access.

10. A processor comprising a buffer according to claim 1.

11. A system comprising a physical memory and a processor according to claim 10.

12. A method for operating a translation look-aside buffer comprising a given number N of entries for storing N respective address translations each of which associate a portion of a given virtual address with a portion of a given physical address, comprising:
a first mode of operation of a processor incorporating said buffer for accessing data stored in a physical memory each entry in said buffer including a first field for storing the virtual address portion, a second field for storing an intermediate address portion, and a third field for storing the physical address portion, the first and third fields mutually associated via the second field,
in response to a request for access to external memory in the first mode of operation of the processor, addressing the buffer by the content of the first fields, and outputting from the buffer the physical address portion stored in the third field of a given entry, when the buffer is addressed by an input value corresponding to the virtual address portion stored in the first field of said entry;
when the address translation corresponding to the access request is not available in the buffer, the first field and the second field of a selected entry in the buffer are updated in a second mode of operation of the processor in which the third field is not accessible; and
the value stored in the second field of the entry in the buffer is read in a third mode of operation of the processor, after the first field and the second field are updated, and the third field of the entry in the buffer is updated in said third mode of operation of the processor.

13. The method of claim 12, comprising additional steps consisting of:
in response to a request for direct access to external memory, addressing the buffer with the content of the second fields; and
outputting from the buffer the physical address portion stored in the third field of a given entry, when the buffer is addressed by an input value corresponding to the value stored in the second field of said entry.

14. An electronic circuit, comprising:
a translation look-aside buffer having a plurality of address storage lines, each storage line comprising memory registers for storing address fields, including a first address field for storing a virtual page number, a second address field for storing an intermediate page number, and a third address field for storing a physical page number, the buffer configured to operate in a first mode to output the content of the memory register storing the physical page number in response to input of a virtual page number in a corresponding memory register that is associated with the memory register storing the physical page number and in response to output of a memory register storing an intermediate page number in the respective address storage lines to operate in a second mode wherein the memory register of the virtual page number and the memory register of the intermediate page number on the respective address storage line are write accessible and the memory register storing the physical page number is not write accessible, and to operate in a third mode wherein the buffer is configured to output content of the memory register storing the physical page number in response to a direct access to external memory request signal addressed to the memory register storing the intermediate page number on the corresponding address storage line when an input value of the request signal corresponds to a value of the intermediate page number.

15. The circuit of claim 14, wherein the first mode of operation is a user mode, the second mode of operation is a non-secure supervisor mode, and the third mode of operation is a secure supervisor mode.

16. The circuit of claim 14, wherein the first mode of operation is a user mode in which at least one application program is executed by the processor, the second mode of operation is a privileged mode in which at least one process of a guest operating system is executed by the processor, and the third mode of operation is a virtual machine monitoring mode.

17. A method of operating a processor having a translation look-aside buffer having a plurality of address storage lines, each address storage line including memory registers for storing address fields that include a first address field for storing a virtual page number, a second address field for storing an intermediate page number, and a third address field for storing a physical page number, the method comprising:
a first operating mode of receiving an input value in the first address field, and outputting from the third address field a physical page number when the input value corresponds to the virtual page number stored in the first address field;

in a second operating mode wherein when the input value does not match a virtual page number in the buffer, the first and the second address fields of a selected entry in the buffer are updated and the third address field is not write accessible; and in a third operating mode of, in response to a request for direct access to external memory, addressing the buffer with the content of the second address field; and outputting from the buffer the physical address number stored in the third address field when the buffer is addressed by an input value corresponding to the value stored in the second address field.

18. The method of claim 17 wherein the intermediate address number stored in the second address field is read after updating of the first address field and the second address field; and the physical page number stored in the third address field is updated in response to reading the value stored in the second address field.

19. A translation look-aside buffer adapted for operation with a memory having physical addresses for data stored therein and a central processing unit (CPU), the CPU supporting multiple guest operating systems (OS), the buffer comprising:

a plurality of memory registers, each memory register having a first field accessible by a virtual page number (VPN), a second field accessible by an intermediate page number (IPN), and a third field accessible by a physical page number (PPN);

the translation look-aside buffer configured to support each guest OS in a user mode of operation a privileged mode of operation via the VPN and IPN addresses; and the translation look-aside buffer configured to operate in a virtual machine monitor (VMM) mode of operation via the IPN and PPN addresses, the VMM mode adapted as the only mode to have access to the PPN address to accommodate guest OS's running in parallel on the CPU to prevent one guest OS from accessing memory areas reserved for other guest OS's, to protect one guest OS from attack from another guest OS, and to protect the data accessed via the PPN addresses from unauthorized guest OS access wherein the processor operates in a first mode of operation such that the buffer is addressable by the content of the first field, the buffer configured so that, in response to a request for access to external memory, it outputs the PPN address by an input value corresponding to the VPN stored in the first field, and for each entry, the first field and the second field are at least write accessible in a second mode of operation of the processor in which the third field is not accessible, and for each entry the second field is read accessible in a third mode of operation of the processor corresponding to the VMM mode, and the third field is at least write accessible in the third mode of operation of the processor.

20. The buffer of claim 19 wherein the first mode of operation is a user mode in which at least one application program is executed by the processor, and the second mode of operation is a privileged mode in which at least one process of a guest operating system is executed by the processor.

* * * * *